US006545577B2

United States Patent
Yap (10) Patent No.: US 6,545,577 B2
(45) Date of Patent: Apr. 8, 2003

(54) FRICTIONLESS PEN EJECTOR MECHANISM

(75) Inventor: Beng Tiek Yap, Singapore (SG)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/883,910

(22) Filed: Jun. 18, 2001

(65) Prior Publication Data

US 2002/0190823 A1 Dec. 19, 2002

(51) Int. Cl.[7] .................................................. H01H 9/00
(52) U.S. Cl. .......................... 335/205; 335/220; 345/179
(58) Field of Search ........................................ 345/179

(56) References Cited

U.S. PATENT DOCUMENTS 4,643,604 A  *  2/1987  Enrico .......................... 401/131
5,644,516 A  *  7/1997  Podwalny et al. ........... 361/681
6,434,403 B1  *  8/2002  Ausems et al. ................ 70/276
6,456,247 B1  *  9/2002  Hulick et al. .................. 335/78

* cited by examiner

Primary Examiner—Anh Mai
Assistant Examiner—Bernard Rojas (57) ABSTRACT

An apparatus and a method for locking and removing a pen using electromagnetism are provided. The apparatus includes a pen housing, a DC source, a coil, a first magnetic element attached to the pen, a second magnetic element and a switch. In some embodiments, a third magnetic element is included. To remove the pen from the pen housing, a user activates a button to magnetize one of the magnetic elements to mutually repel the other. Consequently, the pen is displaced by the repulsion of either the pen from its housing or the pen housing carrying the pen. The pen thus has a protruding end which the user grips to remove the pen from the housing. To lock the pen, the pen is inserted into the housing to be mutually attracted with a magnetic element to be retracted to a locked position.

7 Claims, 6 Drawing Sheets

FRICTIONLESS PEN EJECTOR MECHANISM

FIELD OF THE INVENTION

The present invention relates to an apparatus and a method for locking and ejecting a pen device, such as an input pen used for inputting information into a computer-based device.

BACKGROUND OF THE INVENTION

Portable electronic devices such as personal digital assistants (PDAs) have become increasingly popular. They are lightweight and they embody an array of useful functions, such as, electronic computation and personal information management, all of which are typically provided by desktop computer systems. Portability of these devices has been greatly enhanced by using a display assembly, consisting of a touch panel (or contact-sensitive panel) and a Liquid Crystal Display (LCD), for performing both input and output functions. This eliminates the need to carry another input device, such as a keyboard or a pointing device such as a mouse, or both.

Instead, an input device such as an input pen (or stylus) is used. A user typically contacts the tip of an input pen (or stylus) on the touch panel. By exerting adequate pressure on the touch panel via the pen tip on target images (or icons) displayed on the LCD screen or dragging the pen tip on the touch panel with designated strokes, the user is able to perform navigation, selection and typing functions conveniently.

As the input pen is lightweight and compactly elongated, it is usually stowed within the housing of an electronic device. Most devices use a mechanical locking mechanism to lock the pen during stowing, and a mechanical ejecting mechanism to eject the pen from its housing. An example of such a locking mechanism features a constriction embedded within the pen housing, which engages an annular groove on the pen to lock it. An example of a mechanical ejecting mechanism includes a compressed spring which when released, urges the pen out of the housing. The user then pulls the protruding end to remove the pen.

Such mechanical locking and ejecting mechanisms cause mechanical wear and tear on the pen, on the locking mechanism as well as on the ejection mechanism. As an alternative to having an ejection mechanism, a recess may be built into the opening of the pen housing to allow a user's fingers to comfortably grip a sufficiently protruding end of a stowed pen and pull to remove the pen. During stowing, a protruding pen risks its being caught onto clothes and thereby having the clothes accidentally remove the pen from its housing, whereas an additional recess built into the surface of the device reduces the aesthetic appeal of the device.

Accordingly, there is a need to depart from mechanical locking and ejecting mechanisms and arrive at a desirable apparatus and method for locking and ejecting an input pen.

SUMMARY OF THE INVENTION

The present invention provides a method and apparatus for locking (or retaining) and ejecting a removable device, such as an input pen (or stylus). The present invention uses mutual electromagnetic attraction or repulsion to respectively lock or eject an input pen from its pen housing within a portable electronic device such as a PDA. Alternatively, mutual electromagnetic attraction and repulsion are used to respectively lock or eject a pen housing within the device, for displacing the input pen.

To this end, the apparatus provides a pen housing to hold a pen in a locked or retained position, a locking means to lock the pen and a releasing-ejecting means to release and to eject the pen from the pen housing. To eject the pen, a user activates a switch to operate a circuit for generating a magnetic force to eject the pen from its housing. To lock the pen into the pen housing, the user inserts the pen into its housing. The pen is retracted and locked in the housing by a mutually attractive magnetic force.

Instead of ejecting the pen, a movable pen housing is alternatively ejected within the device. To this end, the apparatus provides a movable pen housing to hold a pen in a locked position, a locking means to lock the pen and a releasing-ejecting means to release and to eject the pen housing. The ejection of the pen housing is limited by the device casing within which the pen housing is housed. One end of the ejecting pen housing hits an inner wall of the device casing and comes to a rest within the device. At the same time, the pen is carried by the ejecting movement such that one end of the pen sufficiently protrudes from the portable device for gripping and removing by a user. To lock the pen in the pen housing, the user inserts the pen into the pen housing. The pen is retracted into the housing and both the pen and the pen housing are locked or retained by a mutually attractive magnetic force.

DETAILED DESCRIPTION OF THE INVENTION

Figure 1:
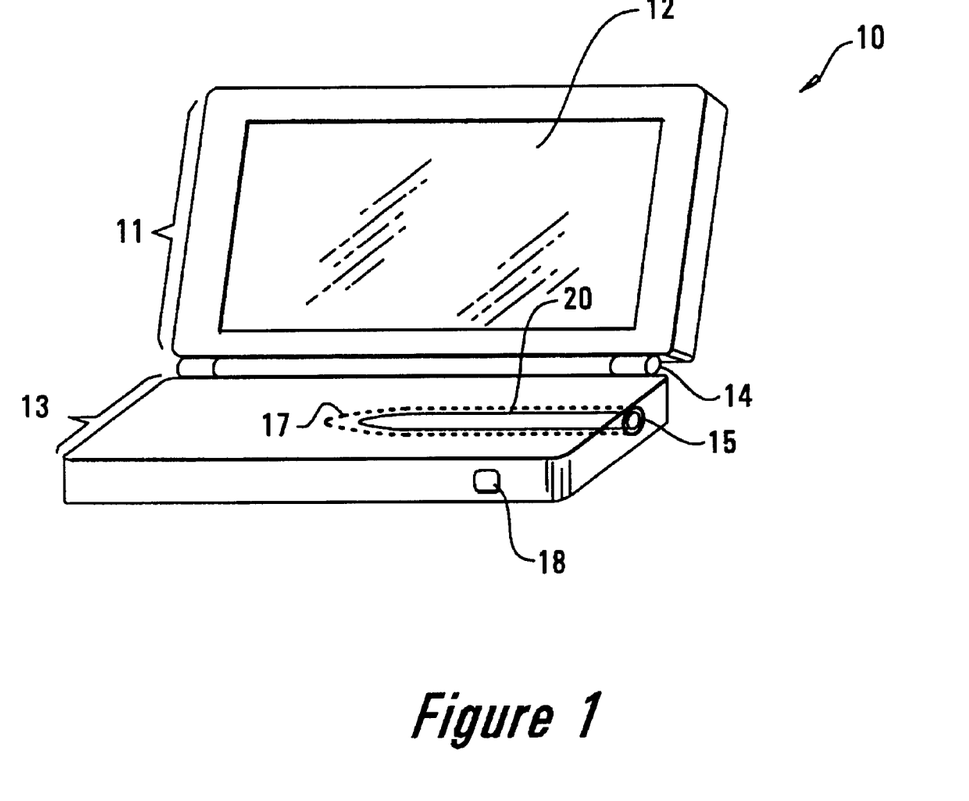
FIG. 1 shows an example of a portable computer-based device: a handheld computer.

Reference is made to FIG. 1. Although a handheld personal computer (PC) is illustrated to refer to a portable device 10, a PDA or a similar device with an input pen is equivalently applicable. The body of a handheld PC is formed mainly by a first shell 11 which houses a display assembly, and a second shell 13 which typically houses a keyboard (not shown), an input pen housing 17 and a printed circuit board assembly (PCBA) (not shown) on which a circuitry essential for operating both the device 10 and the present invention is embedded. The first shell 11 is typically coupled to the second by hinges 14 so that the first shell 11 may function as a flap cover. The display assembly typically consists of a LCD that functions as an output device and a touch panel 12 overlaying the LCD that functions as an input device. To function as an input device, the touch panel 12 works in coordination with an input pen 20. In one aspect, a user may contact and press the tip 22 of a pen 20 on the touch panel 12 upon which graphical images appear, to perform selection function. The Central Processing Unit (CPU) (not shown) embedded on the PCBA then senses the contact position of the pen 20 and thereafter registers the position as a user input. In another aspect, a user may contact the pen tip 22 on the touch panel 12 and drag the pen 20 on the surface of the touch panel 12 with designated strokes as if writing on paper. The net effect is drawing an image on the touch panel 12. Coupled with a suitable software application, the CPU can recognize the drawn image as text, characters or numbers.

An input pen 20 is typically an elongated member for holding by hand in a fashion similar to holding a writing pen. The pen 20 is stowed in a pen housing 17 within the device 10 when it is not used. An opening accessing the interior of the pen housing 17 is, by example, located on a side panel at a second shell 13.

Figure 2:
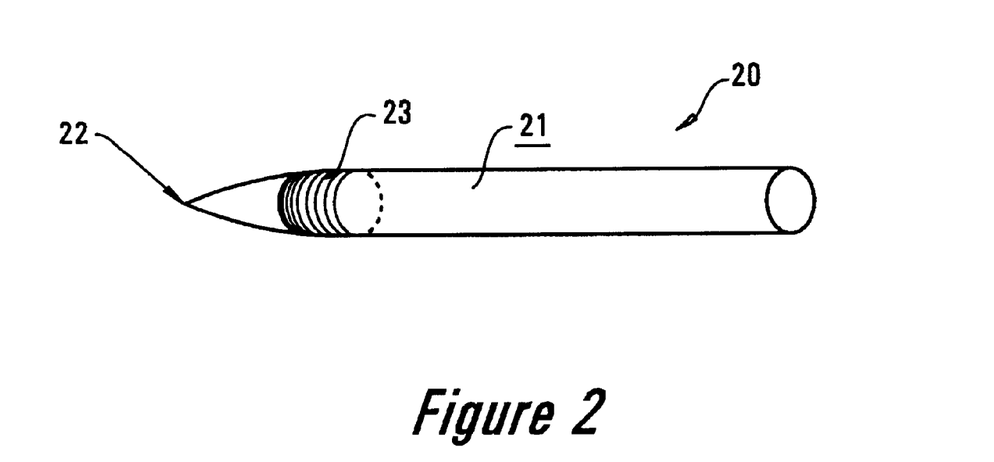
FIG. 2 shows an embodiment of an input pen (or stylus).

An input pen 20 used in the present invention is illustrated in FIG. 2. The pen body 21 is typically made of polymer and its tip 22 of a plastic material known as Delrin®. (Delrin® is the DuPont registered trademark for its acetal resins.) The pen body 21 is substantially cylindrical or barrel-like. One end of the pen 20 is usually tapered cone-shape to mould the tip 22 for contacting the touch panel 12. The rest of the pen body 21 may either be substantially cylindrical or tapered in any direction as known to a person skilled in the art.

The input pen 20 includes a magnetic portion 23 which is made of one of permanent magnet, electromagnet and temporary magnet (described later). The magnetic portion 23 is attached to the barrel of the pen 20 and is in proximity to the pen tip 22. The magnetic portion 23 may be variously located along the length of the pen 20. The magnetic portion 23 may be attached to the pen 20 by wrapping around its barrel, or by replacing a section of the pen body 21 with a magnetic portion 23, or by inserting a magnetic portion 23 into a pre-cast recess within the pen 20, or by having the entire pen 20 as the magnetic portion 23 or by a similar method.

Permanent magnets, electromagnets and temporary magnets are used in combination in the present invention. Permanent magnets retain magnetism and polarity even when electricity is withdrawn. Electromagnets require a continuous source of electricity to retain magnetism as well as to retain or change polarity. Temporary magnets retain magnetism when they are within a strong magnetic field, but lose their magnetism when the magnetic field disappears.

A pen-ejecting button 18 is located on a side panel of the second shell 13 proximate to the opening 15 of the pen housing 17. The button 18 may alternatively be located on any panel of the handheld PC 10. The pen-ejecting button 18 is electrically connected to a switch 38 in a circuitry embedded in the PCBA (not shown), which operates the present invention.

Figure 3:
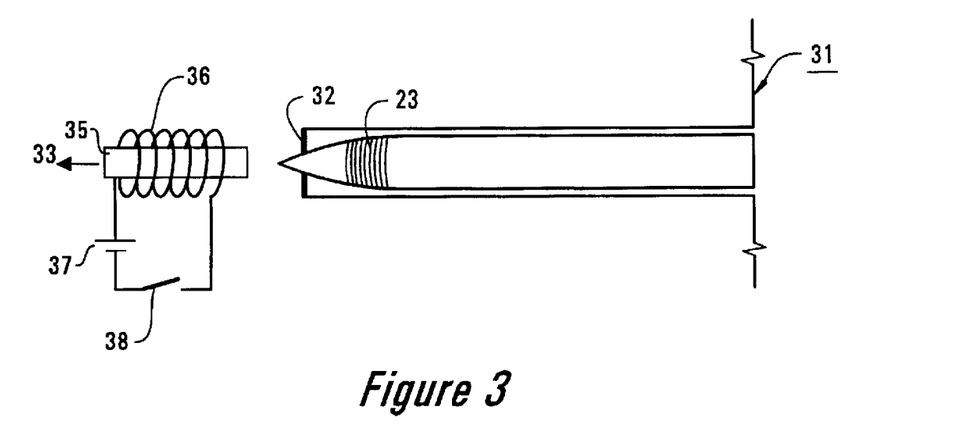
FIG. 3 shows a partial cut-away view of a first embodiment of the present invention with the pen in a locked position.

FIG. 3 shows a first embodiment of the present invention. The pen 20 is in a locked or retained position within its housing 17. One end of the pen 20 is aligned such that it is substantially flush with the exterior 31 of the second shell 13. The other end of the pen 20, i.e., the pen tip 22, is held by a notch 32 to impede further movement of the pen 20 into the pen housing 17. The magnetic portion 23 of the pen 20 is a permanent magnet, while the coil 36 in combination with the iron core 35 is an electromagnet.

The electromagnet is placed close to the notch 32 or touching the pen 20 and is placed along the axial direction 33 of the pen housing 17. The electromagnet can alternatively be placed or arranged proximate to the magnetic portion 23 of the pen 20 when the pen 20 is in a locked position. A circuitry for operating the present invention includes an iron core 35, a coil 36, a power source 37, a switch 38 and electrical connections to the mentioned components. The switch 38 may be implemented as a push button, sliding button or any equivalents that may be activated to close and open an electrical connection. The power source is typically a direct current (DC) source such as a battery. The battery may be a rechargeable main battery used to power the portable device 10; or it may be a separate power source.

Figure 4:
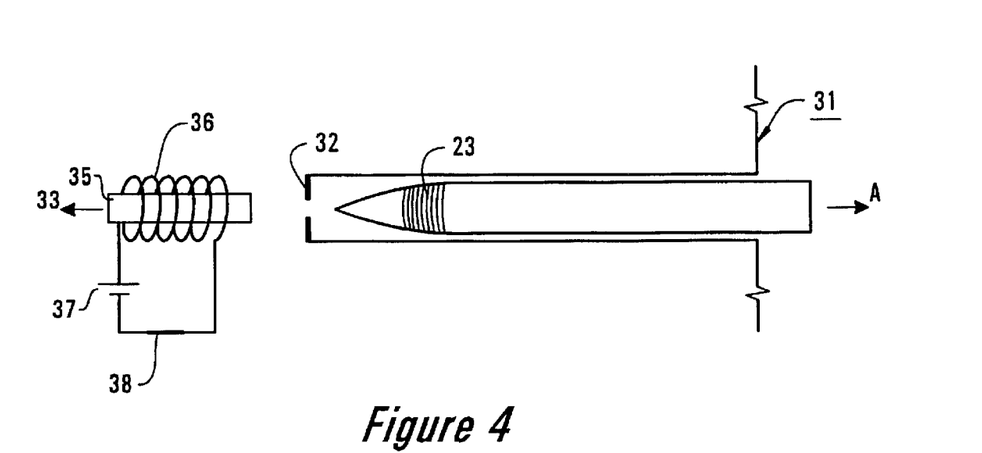
FIG. 4 shows a partial cut-away view of a first embodiment of the present invention at the time of ejection of the pen.

A pen ejection operation of the first embodiment is now described with reference to FIG. 3 and FIG. 4.

While the pen 20 is normally in a locked position as illustrated in FIG. 3, a user activates (or depresses) the pen-ejecting button 18. The button 18 closes via a switch 38 an electrical circuit that operates the present invention. In the closed electrical circuit, current flows from the battery 37 through the electrical connections, coil 36, switch 38 and back to the battery 37, thereby completing the electrical circuit. The current that flows through the coil 36 produces a magnetic field, which magnetizes the iron core 35 within the coil 36 with a predetermined polarity. By winding the coil 36 in a predetermined direction and dispensing current flow in a predetermined direction, polarity of the magnetized iron core 35 can be derived from the Right Hand Rule. The magnetic portion 23, being a permanent magnet, is placed to mutually repel the activated electromagnet. The magnetized iron core 35 is relatively fixed within the device 10. However, the pen 20 has horizontal mobility and is repelled outwardly from its housing 17 in a direction A when unlocked. The repulsive force is sufficient to eject the pen 20 from its housing 17 and to subsequently bring it to a halt. The pen 20 is thereby released from its locked position and ejected when the button is activated. Part of the pen 20 rests within its housing 17 and a protruding end allows the user to comfortably grip the protruding end and pull to remove the pen 20 from the pen housing 17.

Well-known to a person skilled in the art, the magnitude of the repulsive force (or magnetic strength) is dependent upon these factors: the number of windings in the coil 36, the magnitude of current passing through the coil 36 and the permeability of the iron core 35. Hence, these factors may be so adjusted to obtain a desired amount of repulsive force to sufficiently eject the pen 20 with a desired displacement.

In one aspect of the present invention, the switch 38 is a momentary contact switch, which makes closed circuit contact only as long as the switch 38 is held in the activated or ON position. When a user depresses the button 18 to activate the switch 38, the pen 20 is ejected from its housing 17. The pen 20 comes to a rest where only part of the pen 20 rests within its housing 17. A protruding end allows the user to grip and pull the pen 20. The user continues to activate the switch 38 by depressing the button 18 until he removes the pen 20 completely from its housing 17. If the user releases the button 18 before removing the pen 20, the iron core 35 loses its magnetism. A substantial part of the pen 20 still resting within the pen housing 17 is retracted into the housing 17. Hence, if a user forgets to remove the pen 20 after activating and then releasing the button 18, the pen 20 is automatically retracted and locked in its housing 17.

In a second aspect of the present invention, the switch 38 is a maintained-contact switch which makes and retains closed circuit contact when the switch 38 is activated or moved to a ON position. The contact is opened only when the switch 38 is deactivated or moved to a OFF position. To eject the pen 20, a user depresses and thereafter releases the button 18. The pen 20 is ejected until it comes to rest with a protruding end for the user to grip and pull to remove the pen 20. When the user completely removes the pen 20, he deactivates or moves the switch 38 to an OFF position to open the circuit.

In a third aspect of the present invention, the switch 38 includes a time delay mechanism which deactivates the switch or moves the switch to an OFF position after a predetermined time interval. To eject the pen 20, a user depresses and thereafter releases the button 18. The pen 20 is ejected until it comes to a rest with a protruding end. The user can move his fingers from the button 18 to grip and pull the pen 20 to remove it. Within a predetermined time interval from releasing the button 18, the switch 38 remains activated and the pen 20 is held in the ejected position waiting for removal. After the predetermined time interval lapses, the switch 38 is deactivated or moved to an OFF position and the electromagnet loses its magnetism. If the pen 20 were not removed by then, the pen 20 is retracted into the pen housing 17. Hence, if a user forgets to remove the pen 20 after releasing the button 18, the pen 20 is automatically retracted into its housing 17 after a predetermined time interval.

The pen insertion operation to lock (or retain) the pen 20 in the first embodiment is now described.

The user while holding on to the pen 20 at the end furthest from the tip 22, inserts the pen 20, tip 22 first, through the opening 15 into the pen housing 17. When a substantial part of the pen 20 is inserted into the housing 17 such that the magnetic portion 23 on the pen 20 is proximate to the iron core 35, a mutually attractive force between the magnetic portion 23 and the iron core 35 acts to pull both together. As the iron core 35 is substantially fixed within the second shell 13, the pen 20 is retracted into the pen housing 17. The pen 20 moves inwardly within the housing 17 until the pen tip 22 fits into a notch 32. The notch 32 restricts further inward movement of the pen tip 22 by holding the pen tip 22. The pen 20 is now in a locked or retained position.

Figure 5:
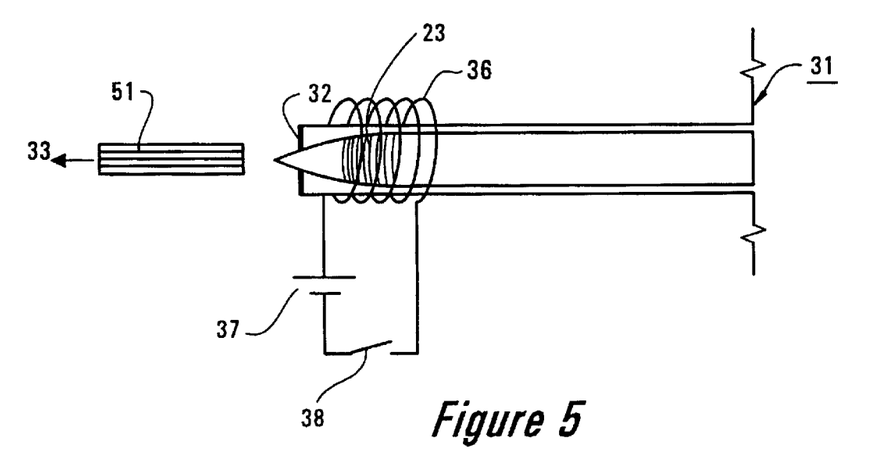
FIG. 5 shows a partial cut-away view of a second embodiment of the present invention with the pen in a locked position.

FIG. 5 shows a second embodiment of the present invention. In this embodiment, a permanent magnet 51 is substantially fixed within the second shell 13 and is placed along the axial direction 33 of the pen housing 17. It can alternatively be placed proximate to the magnetic portion 23 of the pen 20 when the pen 20 is in a locked position. The magnetic portion 23 attached to the pen 20 is an electromagnetic material such as an iron core 35. In a locked position of FIG. 5, the magnetic portion 23 is substantially surrounded by coil windings 36 wound around the walls of the pen housing 17.

Figure 6:
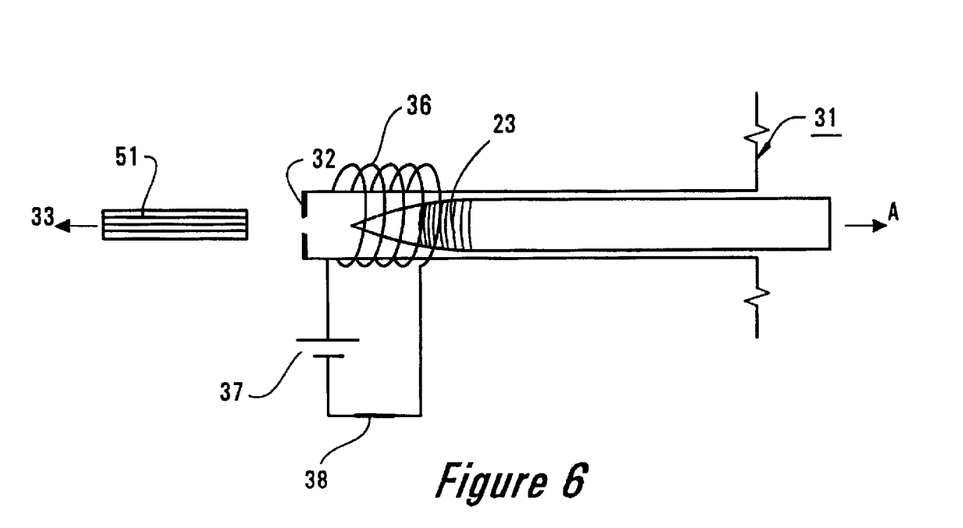
FIG. 6 shows a partial cut-away view of a second embodiment of the present invention at the time of ejection of the pen.

The pen ejection operation of the second embodiment is now described with reference to FIG. 5 and FIG. 6.

While the pen 20 is stowed in a locked position as illustrated in FIG. 5, a user activates the pen-ejecting button 18 to eject the pen 20. The activated button 18 closes via a switch 38 an electrical circuit that operates the invention. Similar to the first embodiment, The magnetic portion 23 is magnetized with a predetermined polarity such that a permanent magnet 51 and a magnetic portion 23 mutually repel each other. The permanent magnet 51, being fastened within a second shell 13, is relatively unmovable. On the other hand, the pen 20 has substantial horizontal mobility and is repelled from its housing 17 outwards in a direction A. The repulsive force is sufficient to eject the pen 20 from its housing 17 and to bring it to a halt. Part of the pen 20 rests within its housing 17 and the protruding end should allow the user to comfortably grip and remove the pen 20.

The pen insertion operation of the second embodiment is similar to that of the first embodiment.

Figure 7:
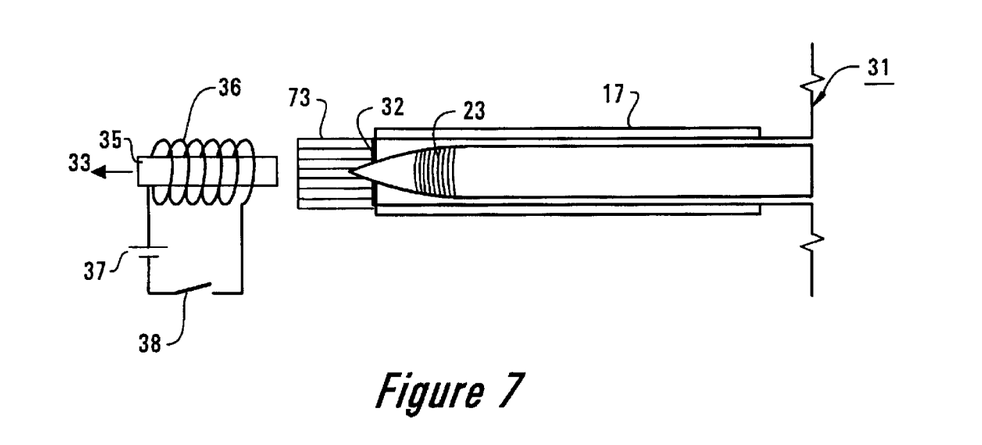
FIG. 7 shows a partial cut-away view of a third embodiment of the present invention with the pen in a locked position.

FIG. 7 shows a third embodiment of the present invention, which extends from that of the first embodiment.

In the third embodiment, the pen housing 17 is movable and has bidirectional mobility within a second shell 13. Its movement is pre-defined and is limited by restricting elements or the like. In FIG. 7, the pen is normally in a locked position within the pen housing 17. One end of the pen 20 is aligned such that it is substantially flush with the exterior 31. In this embodiment, the magnetic portion 23 of the pen 20 is a temporary magnet or an electromagnet or a permanent magnet. For illustration purposes of this embodiment, the magnetic portion 23 refers to a temporary magnet. A permanent magnet 73 is attached to one end of the pen housing 17 furthest from the opening 15. The permanent magnet 73 is attached so that when it is repelled, the pen housing 17 and the pen 20 are carried along with the movement. In a locked position, the permanent magnet 73 mutually attracts and pulls the magnetic portion 23 towards it, thereby locking the pen 20 in the pen housing 17.

A circuitry for operating this embodiment is similar to that of the first embodiment and the electromagnet is located along an axial direction 33 in proximity to an end of the pen housing 17 furthest from the opening 15. It can alternatively be placed proximate to the magnetic portion 23 of the pen 20 when the pen 20 is in a locked position. The coil 36 of the circuitry encloses an iron core 35 substantially fixed within the second shell 13.

Figure 8:
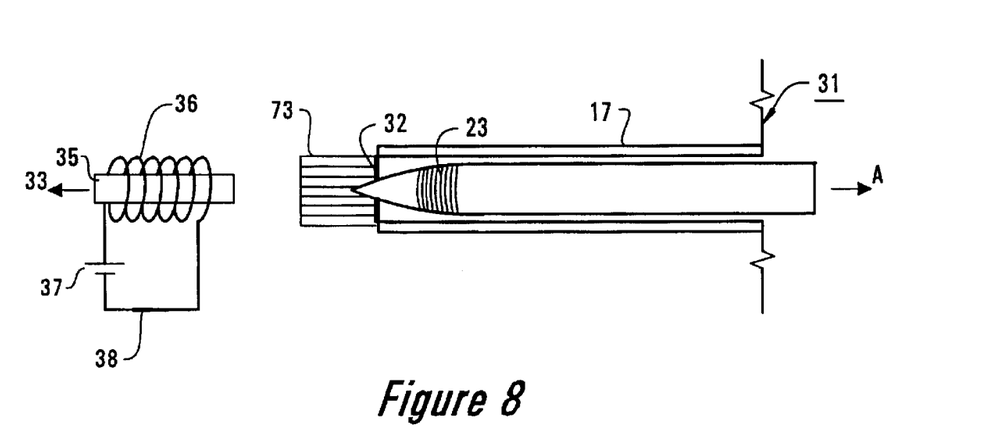
FIG. 8 shows a partial cut-away view of a third embodiment of the present invention at the time of ejection of the pen housing.

The pen displacement operation of the third embodiment is now described with reference to FIG. 7 and FIG. 8. Instead of ejecting the pen 20, the pen housing 17 is ejected to displace the pen 20 for removal.

While the pen 20 is stowed in a locked position as illustrated in FIG.7, a user activates the pen-ejecting button 18. In a similar way as in the first embodiment, the activated button 18 operates a circuitry to magnetize an iron core 35. The polarity of the magnetized core 35 is pre-determined so that the permanent magnet 73 is repelled by the relatively fixed magnetized iron core 35. As the permanent magnet 73 is attached to the movable pen housing 17, the repelled permanent magnet 73 moves the pen housing 17 away from the magnetized iron core 35 until the pen housing 17 is stopped by an inner wall of the device or by a restricting element, and comes to a stop. The pen 20 now protrudes from the second shell 13, thus allowing a user to grip and remove the pen 20. During this while, the magnetic portion 23 is mutually attracted to the permanent magnet 73, thereby firmly holding the pen 20 within the pen housing 17 while the pen housing 17 is repelled or ejected. When the pen 20 is ejected, the user merely pulls to dislodge the pen 20 from the permanent magnet 73 to overcome a mutual attractive force between the permanent magnet 73 and the magnetic portion 23, to remove the pen 20.

The pen insertion operation of the third embodiment is now described.

The user while holding on to the pen 20 at the end opposite the tip 22, inserts the pen 20, tip 22 first, through the opening 15 into the pen housing 17. When a substantial part of the pen 20 is inserted into the housing 17 such that the pen tip 22 touches the permanent magnet, the permanent magnet attracts the magnetic portion 23 of the pen 20 to lock the pen 20. A recess with the shape of the pen tip 22 to contain the pen tip 22 may be provided in the recess. Further urging of the pen 20 into the pen housing 17 pushes the pen housing 17 inwards until the permanent magnet is in proximity or touches the iron core 35. The pen housing 17 is now locked in a locked position.

Figure 9:
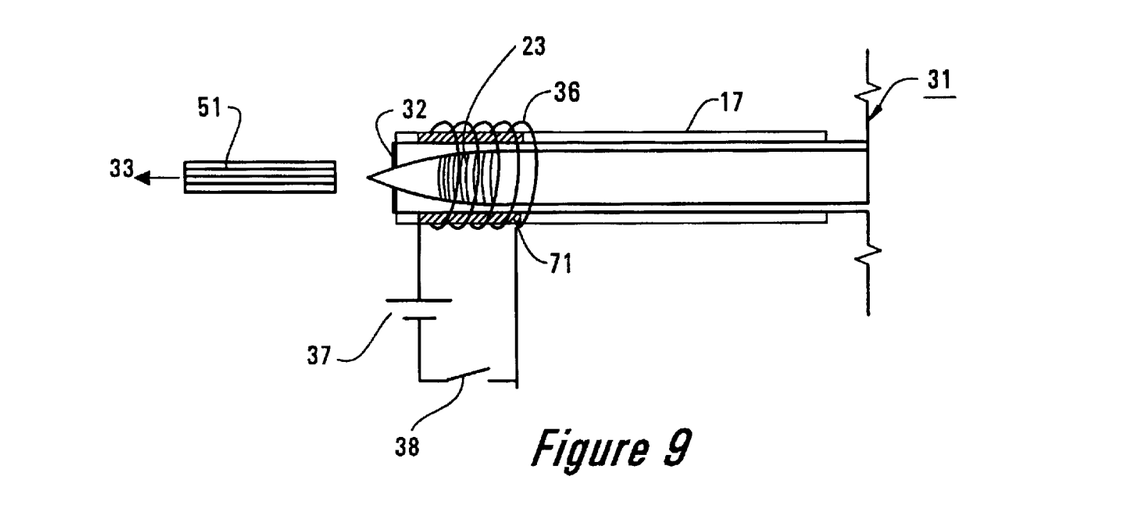
FIG. 9 shows a partial cut-away view of a fourth embodiment of the present invention with the pen in a locked position.

FIG. 9 shows a fourth embodiment of the present invention, which extends from that of the second and third embodiment.

Similar to the second embodiment, a permanent magnet 51 is substantially fixed within the second shell 13 and is placed along the axial direction 33 of the pen housing 17. It can alternatively be placed proximate to the magnetic portion 23 of the pen 20 when the pen 20 is in a locked position. The magnetic portion 23 is a temporary magnet or an electromagnet. For illustration purposes of this embodiment, the magnetic portion 23 refers to a temporary magnet. The pen housing 17 has at least a section 71 of the housing 17 made of electromagnetic material which surrounds at least a substantial part of the magnetic portion 23.

Figure 11:
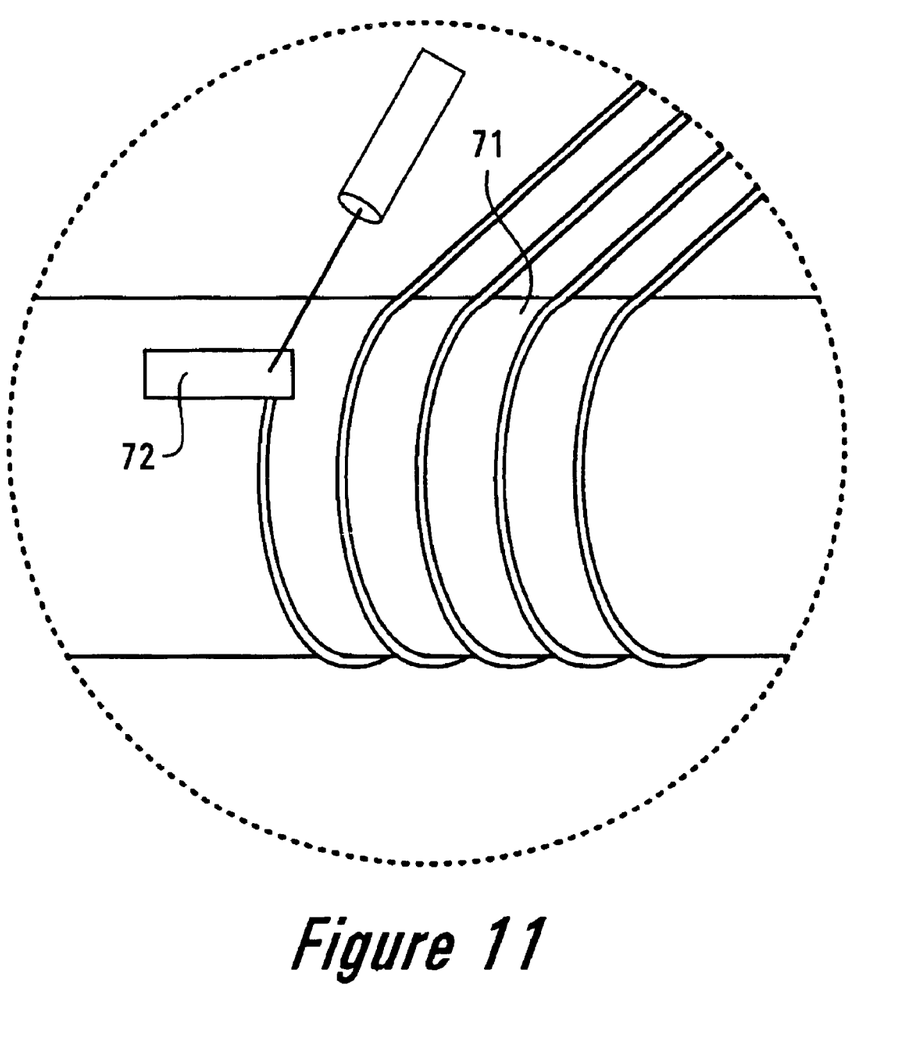
FIG. 11 is an exploded view of a contact brush pad used in a fourth embodiment of the present invention.

A circuitry for operating the present invention includes a coil 36 wound around at least a section 71 of the pen housing 17 of which at least the section 71 is made of electromagnetic material. In this embodiment, the pen housing 17 is movable and has bidirectional mobility similar to the third embodiment. Even as the pen housing 17 moves, the circuit needs to be electrically complete. Hence, a contact brush pad 72 as shown in FIG. 11 is provided on a surface of the pen housing 17 to provide continuous electrical contact between the coil 36 and the electrical connections to the power source and switch 38 during movement of the pen housing 17.

FIG. 9 shows the pen 20 in a locked position with one end substantially flushed with the exterior 31 of the second shell 13. The permanent magnet 51 substantially fixed within the second shell 13 attracts the magnetic portion 23 attached to the pen 20, thereby locking the pen 20 in the pen housing 17 in a locked position.

Figure 10:
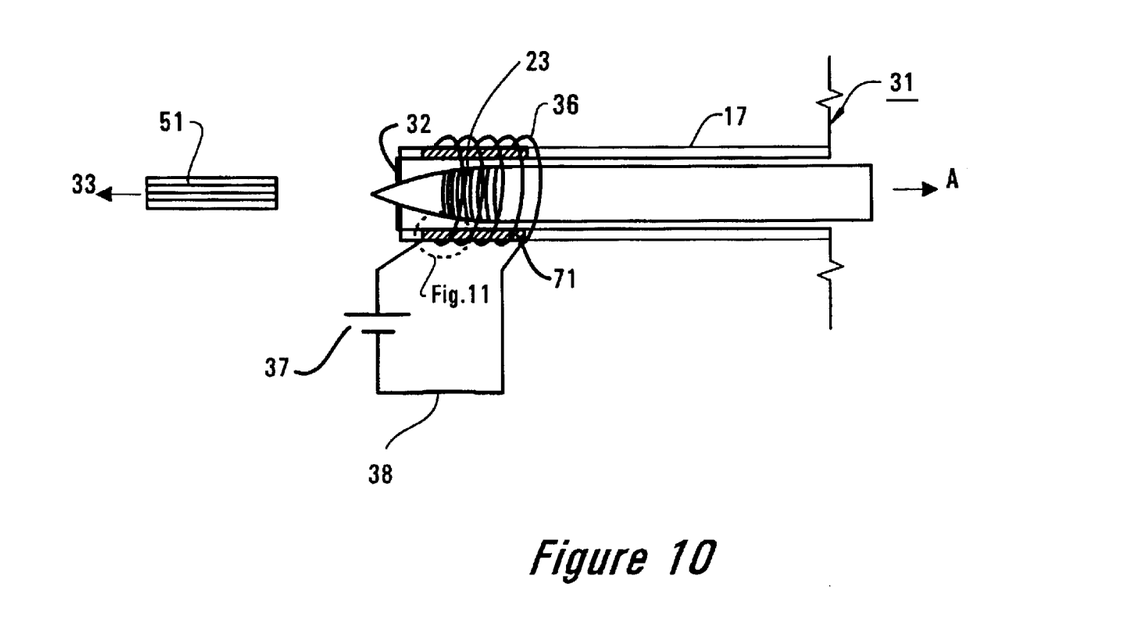
FIG. 10 shows a partial cut-away view of a fourth embodiment of the present invention at the time of ejection of the pen housing.

The pen displacement operation of the fourth embodiment is now described with reference to FIG. 9 and FIG. 10.

While the pen 20 is stowed in a locked position as illustrated in FIG. 9, a user activates the pen-ejecting button 18. Similar to the first embodiment, the activated button operates the circuit to activate the electromagnetic section of the pen housing 17. Polarity of the magnetized pen housing 17 is pre-determined so that the permanent magnet 51 now mutually repel the magnetized pen housing 17. As the permanent magnet 51 is relatively fixed within the device, it repels the pen housing 17 and pushes it away in a direction A until the pen housing 17 hits against the wall of the second shell 13 and comes to a stop. The pen 20 protrudes from the second shell 13, thus allowing a user to grip and remove the pen 20. During this while, the magnetized section 71 attracts the magnetic portion 23 on the pen 20 and locks the pen 20 inside the pen housing 17. The pen 20 is thus firmly held and locked within the pen housing 17 while the pen housing 17 is repelled or ejected. When the pen housing 17 is ejected, the user merely pulls to dislodge the pen 20 from the magnetized pen housing 17 to overcome a mutual attractive force between the magnetic portion 23 and the magnetized section 71 of the pen housing 17.

The pen insertion operation of the fourth embodiment is now described.

The user inserts the pen 20, tip 22 first, through an opening 15 into the pen housing 17. When a substantial part of the pen 20 is inserted into the housing 17, the pen tip 22 reaches one end of the pen housing 17 where a notch 32 may be provided to contain the pen tip 22. Further urging of the pen 20 pushes the pen housing 17 inwards until the pen tip 22 is in proximity or touches the permanent magnet 51, and the end of the pen 20 furthest from the pen tip 22 is substantially flush with the exterior 31 of the second shell 13. The pen housing 17 is now in a locked position.

In all embodiments, the three types of switches described earlier can also be used similarly. In the third and the fourth embodiments, if the pen 20 were removed and the switch 38 deactivated, only the pen housing 17 would be retracted and locked within the device 10. If the switch 38 were deactivated before the pen were removed, the pen housing 17 would be retracted and carrying the pen along with it to a locked position.

In the first and third embodiment, the respective electromagnet may consist of only the coil 36 without the iron core 35 while the coil 36 functions as an electromagnet. Hence, the coil 36 may also be referred to as a magnetic element.

In using the present invention in computer-based devices, a person skilled in the art will appreciate that shielding the PCBA from the electromagnetic field arising form using the present invention might be necessary.

The present invention is well suited for computer-based devices with removable elements, such as a pen 20 and removable drives. Portable devices of this kind with a touch panel include handheld personal computers, personal organizers, cellular phones, pagers, and the like. However, the present invention may also be used in non-portable devices alike.

I claim:

1. An apparatus for removing and locking a pen in a portable device, wherein the pen has a first magnetic element, comprising:

a second and a third magnetic element in the portable device; and means for generating a mutually repulsive or attractive force between the second and the third magnetic elements to respectively eject or lock a movable pen housing within the portable device for respectively locking or removing the pen.

2. An apparatus for removing and locking a pen having a first magnetic element attached thereto when the pen is locked in a movable pen housing within a portable device, comprising:

a coil, proximate to the pen housing, having a predetermined number of windings in a predetermined direction and connected to a DC source; and a switch for closing a circuit which includes the coil and the DC source, whereby closing the circuit magnetizes with a predetermined polarity at least the second magnetic element, which is placed within the coil and is proximate to a third magnetic element for mutual repulsion, to displace the pen and the pen housing.

3. The apparatus recited in claim 2 wherein on inserting the pen into the pen housing, the pen is retracted and locked in the pen housing, through a mutually attractive force between the first and the third magnetic elements, when the circuit is open.

4. A method for removing and locking a pen having a first magnetic element attached thereto when the pen is locked in a movable pen housing within a portable device, comprising:

placing a coil, proximate to the pen housing, having a predetermined number of windings in a predetermined direction and connected to a DC source; and activating a switch for closing a circuit which includes the coil and the DC source, whereby closing the circuit magnetizes with a predetermined polarity at least the second magnetic element, which is placed within the coil and is proximate to a third magnetic element for mutual repulsion, to displace the pen and the pen housing.

5. The method recited in claim 4 further comprising retracting and locking the pen in the pen housing, through a mutually attractive force between the first and the third magnetic elements, when the circuit is open.

6. The method recited in claim 5 further comprising providing the first magnetic element as one of a temporary magnet, an electromagnet and a permanent magnet, the second magnetic element as an electromagnet and the third magnetic element is a permanent magnet.

7. The method recited in claim 4 further comprising providing the switch as one of momentary-contact, maintained-contact and time delay.

\* \* \* \* \*